United States Patent Office.

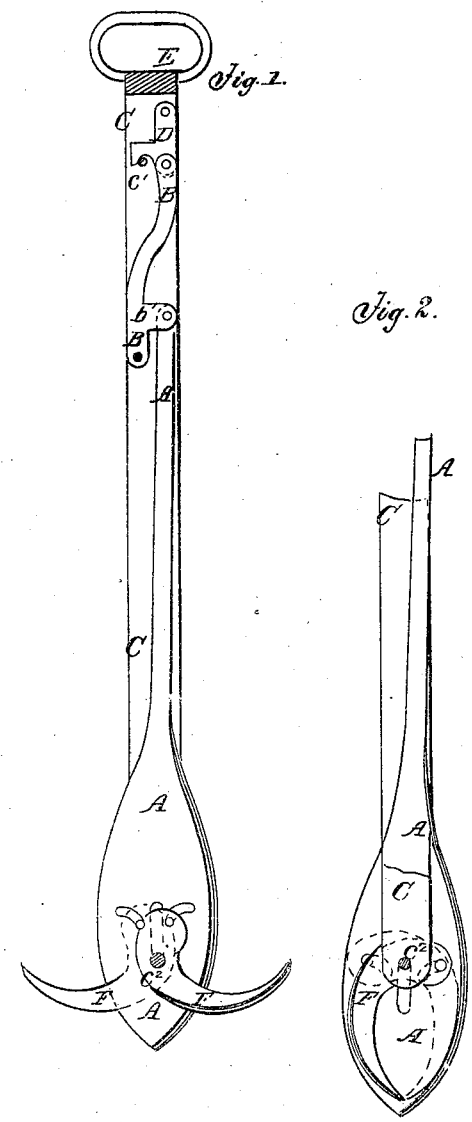

F. W. THORLA, OF HOSKINSVILLE, OHIO.

Letters Patent No. 99,033, dated January 18, 1870.

IMPROVEMENT IN HORSE HAY-FORKS.

The Schedule referred to in these Letters Patent and making part of the same.

*To all whom it may concern:*

Be it known that I, F. W. THORLA, of Hoskinsville, in the county of Noble, and State of Ohio, have invented a new and useful Improvement in Horse Hay-Forks; and I do hereby declare that the following is a full, clear, and exact description thereof, which will enable others skilled in the art to make and use the same, reference being had to the accompanying drawings, forming part of this specification, in which—

Figure 1 is a side view of my improved fork, one of the side plates being removed, and showing the parts in position for raising the hay.

Figure 2 is a detail view of the lower part of the fork, showing the parts in position for being thrust into the hay.

Similar letters of reference indicate corresponding parts.

My invention has for its object to furnish an improved horse hay-fork, simple in construction, easily operated, and effective in operation, being so constructed as to be readily thrust into the hay, and which will hold the load securely until it is discharged; and It consists in the construction and combination of the various parts of the fork, as hereinafter more fully described.

A is the central piece or blade of the fork, the lower part of which is made somewhat in the shape of an arrow-head, as shown in figs. 1 and 2, and the side edges of which are bevelled to an edge upon opposite sides, as shown in figs. 1 and 2, so that it may easily cut its way both into and out of the hay.

The upper end of the shank or stem of the blade A is pivoted to a short arm, $b'$, projecting from the side edge of the lever B, near its lower end.

The lower end of the lever B is pivoted to and between the plates or bars C, between which the blade A is placed.

The lever B is slightly bent, as shown in fig. 1, and to its upper end is pivoted a bent lever, D, having a notch or hook formed upon its lower arm, and an eye formed in the end of its upper arm, for the reception of the trip-cord.

The hook D hooks upon a rivet or bolt, $c'$, passing through the bars or plates C, to lock the fork in position to support the load.

The upper ends of the side bars or plates C are riveted, welded, or otherwise secured to, or formed solid with an eye, E, to which the hoisting-rope is to be attached.

The lower ends of the bars or plates C are connected by a bolt or rivet, $c^2$, which passes through a short longitudinal slot in the blade A, and through holes in the prongs F, so that the blade A may slide up and down vertically, and so as, at the same time, to pivot the said prongs to the bars or plates C.

The prongs F are made curved, and in about the form shown in figs. 1 and 2, are placed one upon each side of the blade A, and have inwardly-projecting guide-pins attached to their upper or inner ends, which enter curved slots in the blade A, as shown in fig. 1, so that as the blade A is drawn upward by raising the lever B, the prongs F may be projected, as shown in fig. 1, to hold the load of hay, and so that when the lever B is unlocked or tripped, the weight of the hay upon the fork may force the blade A downward, bringing the prongs F into the position shown in fig. 2, allowing the hay to drop from the said fork.

The outer or convex edges of the prongs F are bevelled off upon their outer sides, as shown in figs. 1 and 2, so that they may not interfere with the cutting-edges of the blade A.

In using the fork, the blade A and prongs F are brought into the position shown in fig. 2. The fork is then forced downward, the blade A cutting its way into the hay, and the projecting lever B being used used as a foot-rest or bracket.

When the fork has been forced into the hay to the desired depth, the lever B is raised, and the hook D caught or hooked upon the pin or bolt $c^1$, securely locking the fork.

When the loaded fork has been raised and carried to the desired position, the hook D is unhooked by means of the trip-rope, allowing the hay to be discharged.

Having thus described my invention,

I claim as new, and desire to secure by Letters Patent—

The lever trip-hook D, in combination with the plates or bars C, lever B, blade A, and prongs F, substantially as herein shown and described, and for the purpose set forth.

F. W. THORLA.

Witnesses:
A. H. THORLA,
W. HOSKIN.